(12) United States Patent
del Monte et al.

(10) Patent No.: US 11,241,112 B2
(45) Date of Patent: Feb. 8, 2022

(54) HAND-HELD FRUIT PITTER

(71) Applicant: Helen of Troy Limited, St. Michael (BB)

(72) Inventors: Becca del Monte, Brooklyn, NY (US); Mack Mor, Brooklyn, NY (US); Mark Drayer, New York, NY (US); Dio Climaco Cavero, North Merrick, NY (US); Zoe Mikhailovich, New York, NY (US)

(73) Assignee: Helen of Troy Limited, St. Michael (BB)

( * ) Notice: Subject to any disclaimer, the term of this patent is extended or adjusted under 35 U.S.C. 154(b) by 183 days.

(21) Appl. No.: 16/782,684

(22) Filed: Feb. 5, 2020

(65) Prior Publication Data

US 2021/0235914 A1 Aug. 5, 2021

(51) Int. Cl.
*A47J 23/00* (2006.01)
*A23N 4/00* (2006.01)

(52) U.S. Cl.
CPC ............... *A47J 23/00* (2013.01); *A23N 4/00* (2013.01)

(58) Field of Classification Search
CPC ............. A47J 23/00; A23N 3/00; A23N 4/00
USPC ........................................ 99/547, 553, 555
See application file for complete search history.

(56) References Cited

U.S. PATENT DOCUMENTS

| 63,716 | A | * | 4/1867 | Stoner | A23N 4/06 |
| | | | | | 99/560 |
| 103,317 | A | * | 5/1870 | Fischer | A23N 4/06 |
| | | | | | 99/559 |
| 103,802 | A | | 5/1870 | Webster | |
| 275,353 | A | | 4/1883 | Buck | |
| 719,131 | A | * | 1/1903 | Parker | A47J 25/00 |
| | | | | | 30/113.3 |
| 741,194 | A | * | 10/1903 | Van Uffel | A47J 25/00 |
| | | | | | 30/113.2 |
| 1,167,005 | A | | 1/1916 | Marshall | |
| 1,171,546 | A | * | 2/1916 | Schnee | A47J 25/00 |
| | | | | | 30/113.2 |

(Continued)

FOREIGN PATENT DOCUMENTS

| DE | 737440 | 7/1943 |
| DE | 4104414 | 5/1992 |

(Continued)

OTHER PUBLICATIONS

European Patent Office, Extended European Search Report for European Patent Application No. 21154024.0, dated May 27, 2021.

*Primary Examiner* — Sean M Michalski
(74) *Attorney, Agent, or Firm* — Helen of Troy Limited

(57) ABSTRACT

A fruit pitter includes a frame, a fruit holder supported by the frame, and a lid and a pusher plate each pivotally attached to the frame. The fruit holder has a hole formed therethrough. The lid is moveable between a fully closed position adjacent to the fruit holder and a fully open position away from the fruit holder. A cutting rod depending from the lid passes through the fruit holder hole when the lid is moved from the fully open position to the fully closed position. The lid and the pusher plate rotate relative to the frame about a common rotational axis. The pusher plate is located between the fruit holder and the lid, and the cutting rod passes through the pusher plate as the lid is moved between the fully closed position and the fully open position.

19 Claims, 10 Drawing Sheets

(56) References Cited

U.S. PATENT DOCUMENTS

| | | | | |
|---|---|---|---|---|
| 1,331,274 A * | 2/1920 | Marshall | A23N 4/06 | 99/560 |
| 1,390,804 A * | 9/1921 | Marshall | A23N 4/06 | 99/560 |
| 1,432,012 A * | 10/1922 | Barndt | A47J 23/00 | 30/113.2 |
| 1,762,489 A * | 6/1930 | Stinson | E05D 11/082 | 16/337 |
| 2,133,588 A * | 10/1938 | Steinwand | A23N 4/24 | 99/556 |
| 2,463,854 A * | 3/1949 | Cowan | A47J 23/00 | 99/559 |
| 2,535,928 A * | 12/1950 | Ives | A47J 23/00 | 99/561 |
| 2,712,333 A * | 7/1955 | Hirao | A23N 4/06 | 99/560 |
| 2,735,467 A * | 2/1956 | Hellmich | B26D 3/26 | 241/84.3 |
| 3,308,835 A * | 3/1967 | Silverberg | A45D 40/22 | 220/263 |
| 3,469,612 A * | 9/1969 | Hesse | A23N 4/08 | 269/13 |
| 5,692,424 A * | 12/1997 | Wallace | A47J 36/00 | 83/167 |
| 6,805,032 B2 * | 10/2004 | Engdahl | B26D 1/553 | 30/114 |
| D499,615 S * | 12/2004 | Nordgren | D7/674 | |
| 7,444,909 B2 * | 11/2008 | Repac | B26D 3/185 | 83/167 |
| 7,549,227 B2 * | 6/2009 | De Blasis | A47J 23/00 | 30/113.2 |
| 7,992,476 B2 * | 8/2011 | Kaposi | B26D 3/185 | 83/167 |
| 8,347,783 B2 | 1/2013 | Kaposi | | |
| 8,578,845 B2 * | 11/2013 | Waymire | A47J 25/00 | 99/559 |
| 9,125,433 B2 * | 9/2015 | Vincenti | A23N 4/06 | |
| 9,174,352 B2 * | 11/2015 | Repac | B26D 3/26 | |
| 2010/0199863 A1 * | 8/2010 | Kaposi | A47J 23/00 | 99/553 |
| 2015/0251826 A1 * | 9/2015 | Lee | B65D 47/0895 | 220/812 |
| 2016/0193744 A1 * | 7/2016 | Patel | B26D 3/11 | 83/167 |

FOREIGN PATENT DOCUMENTS

| | | |
|---|---|---|
| DE | 202011106079 U | 2/2012 |
| DE | 202011002632 | 5/2012 |
| DE | 102015109401 | 12/2016 |

* cited by examiner

HAND-HELD FRUIT PITTER

BACKGROUND

There are several popular hand-held devices for pitting fruit, for example, cherries. Most of these devices remove a single cherry pit from a single cherry, and are slow and tedious to use. There are also devices that remove several cherry pits from several cherries held in a receptacle; however, these devices require unloading into a separate container which slows down the pitting process.

SUMMARY

According to one aspect, a fruit pitter comprises a supporting frame, a fruit holder supported by the frame, and a lid and a pusher plate each pivotally attached to the frame. The fruit holder has a hole formed therethrough. The lid is moveable between a fully closed position adjacent to the fruit holder and a fully open position away from the fruit holder. A cutting rod depends from the lid. The cutting rod passes through the fruit holder hole when the lid is moved from the fully open position to the fully closed position. The lid and the pusher plate rotate relative to the frame about a common rotational axis. The pusher plate is located between the fruit holder and the lid, and the cutting rod passes through the pusher plate as the lid is moved between the fully closed position and the fully open position.

According to another aspect, a fruit pitter comprises a supporting frame, a fruit holder supported by the frame, and a lid and a pusher plate each pivotally attached to the frame. The fruit holder has a hole formed therethrough. The lid is moveable between a fully closed position adjacent to the fruit holder and a fully open position away from the fruit holder. A cutting rod depends from the lid. The cutting rod passes through the fruit holder hole when the lid is moved from the fully open position to the fully closed position. The pusher plate is moveable in tandem with the lid. The pusher plate is located between the fruit holder and the lid, and the cutting rod passes through the pusher plate as the lid is moved between the fully closed position and the fully open position. The frame includes a stop member configured to preclude movement of the pusher plate past a predetermined orientation relative to the frame as the lid is moved to the fully open position where the lid is angularly offset from the pusher plate.

According to another aspect, a fruit pitter comprises a supporting frame defining an interior cavity. A fruit holder is supported by the frame and at least partially covers the interior cavity. The fruit holder has a hole formed therethrough. A lid is pivotally attached to the frame. The lid is moveable between a fully closed position adjacent to the fruit holder and a fully open position away from the fruit holder. A cutting rod depends from the lid for penetrating fruit held by the fruit holder. The cutting rod passes through the fruit holder hole when the lid is moved from the fully open position to the fully closed position. A pusher plate is movable relative the lid. The cutting rod passes through an aperture formed in the pusher plate as the lid is moved between the fully closed position and the fully open position. With the lid at least substantially in the fully open position movement of the pusher plate relative to the lid pushes pitted fruit off the cutting rod allowing the pitted fruit to fall through a portion of the interior cavity defined by the frame not covered by the fruit holder.

DETAILED DESCRIPTION

Figure 1:
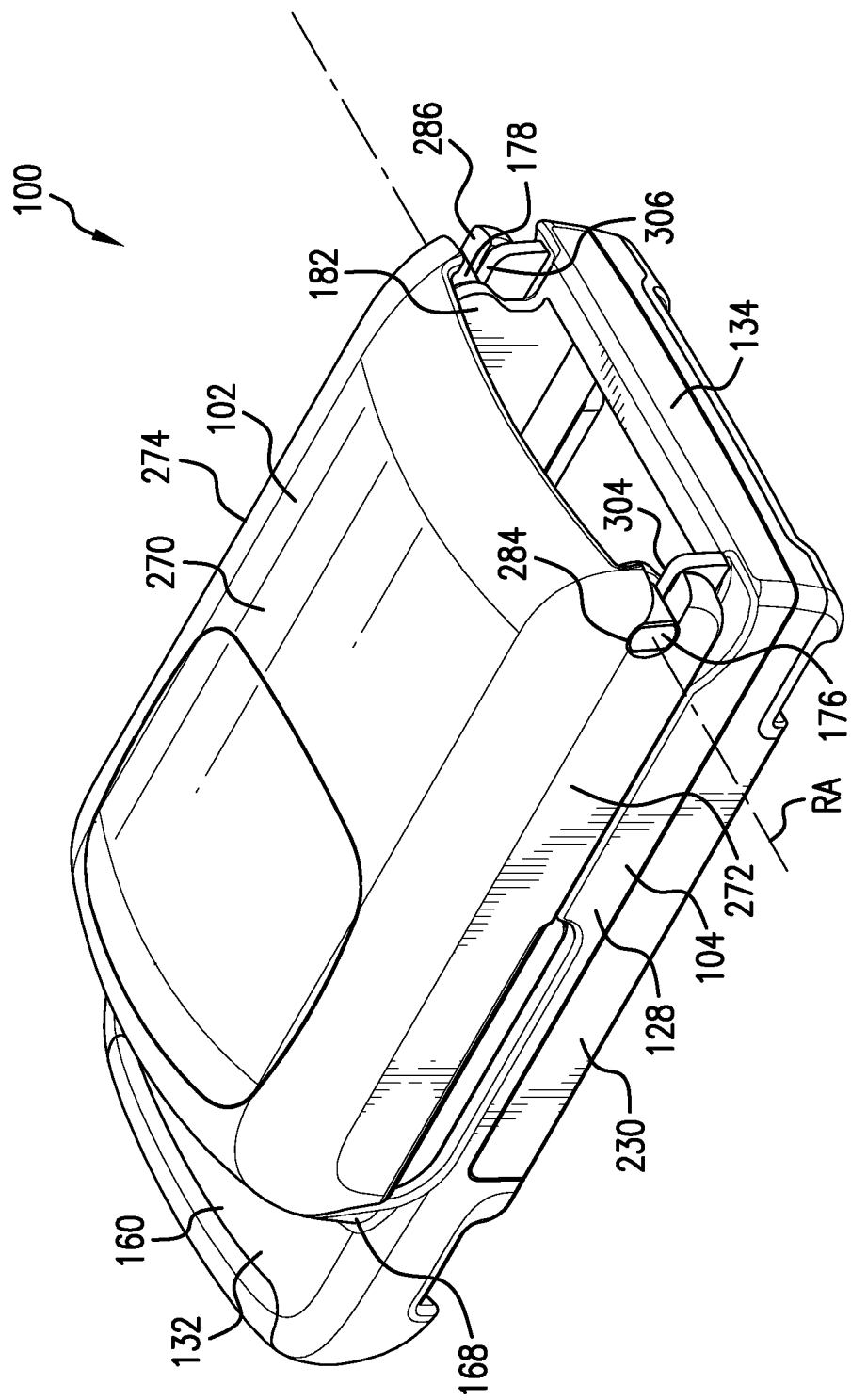
FIG. 1 is a perspective view of a fruit cutter according to one embodiment of the present disclosure.
Figure 2:
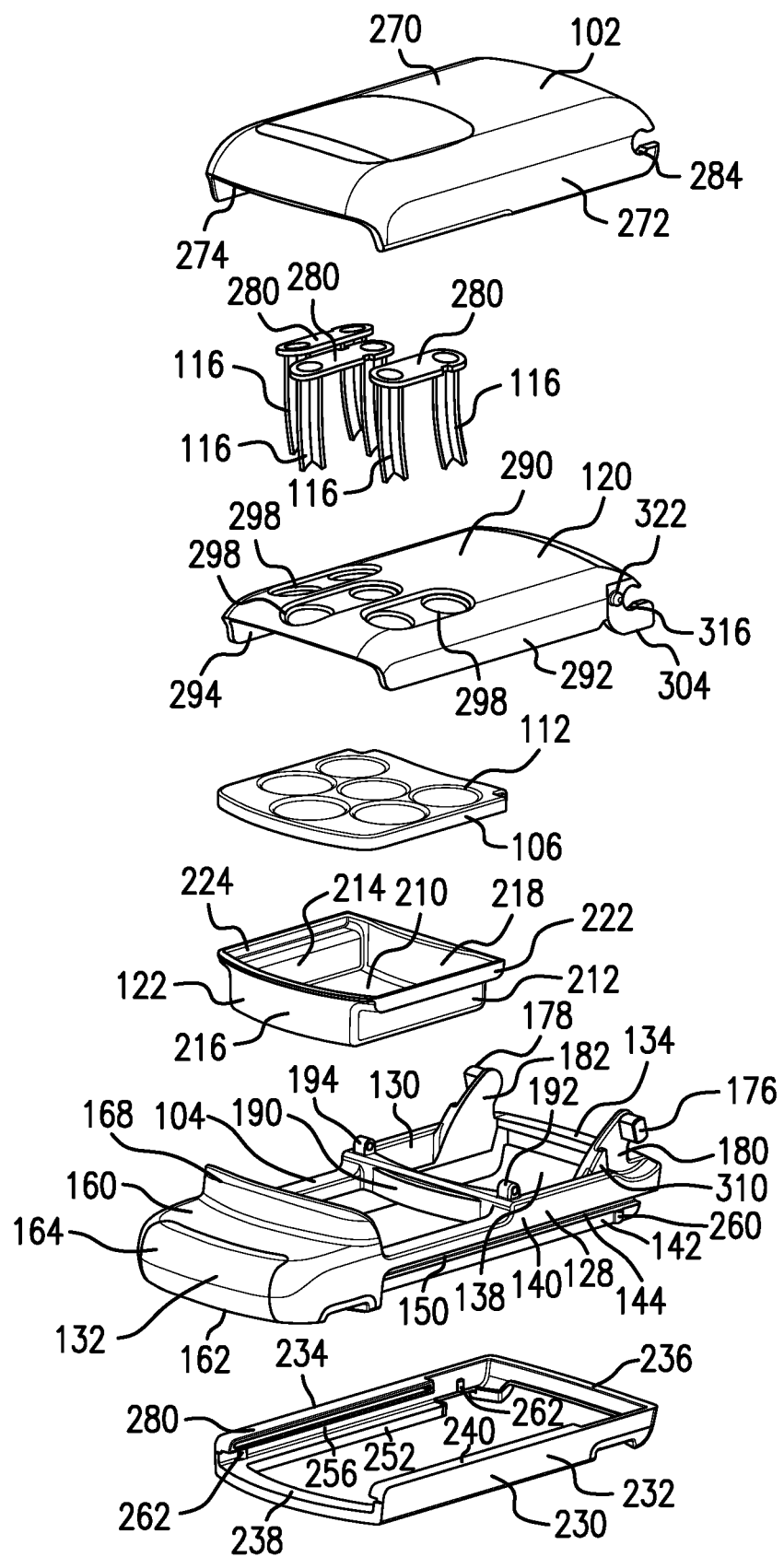
FIG. 2 is an exploded perspective view of the fruit cutter of FIG. 1.
Figure 3:
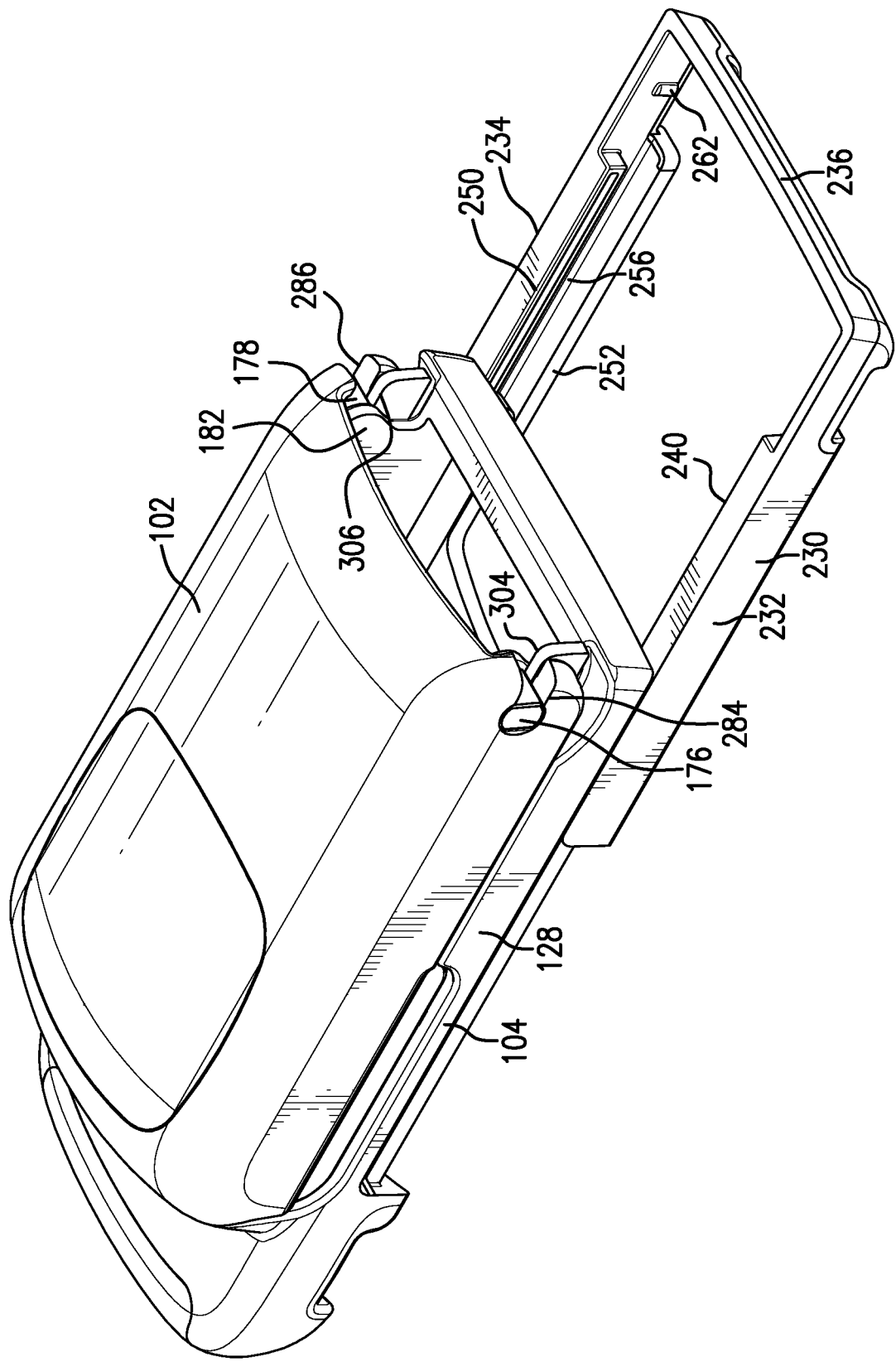
FIG. 3 is a perspective view of the fruit cutter of FIG. 1 with a leg in an extended position.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIGS. 1-4 illustrate a hand-held device 100 according to one embodiment of the present disclosure for pitting fruit, for example, cherries (hereinafter referred to as a "cherry pitter"). The cherry pitter 100 generally includes a lid 102 mounted on a supporting frame 104 for pivotal movement about a rotational axis RA. A fruit holder 106 is pivotally secured at the top of the frame. The fruit holder 106 has at least one hole (not visible, similar to hole 412 in FIG. 9) formed therethrough for holding fruit on the holder as the fruit is being pitted. In the illustrated aspect, the fruit holder 106 has at least one cavity 112 having the at least one hole formed therethrough, the cavity 112 sized to hold the fruit. At least one cutter or cutting rod 116 for penetrating the fruit is secured to and depends from the lid 102. As depicted, the cherry pitter 100 includes a number of cutting rods 116 that match a corresponding number of holes formed in the holder 106 in order to simultaneously remove the pits from several cherries held within the cavities 112. Further depicted is a pusher plate 120 mounted to the frame 104 for pivotal movement about the same rotational axis RA, and a receptacle 122 removably supported by the frame 104 for receiving pits.

Figure 4:
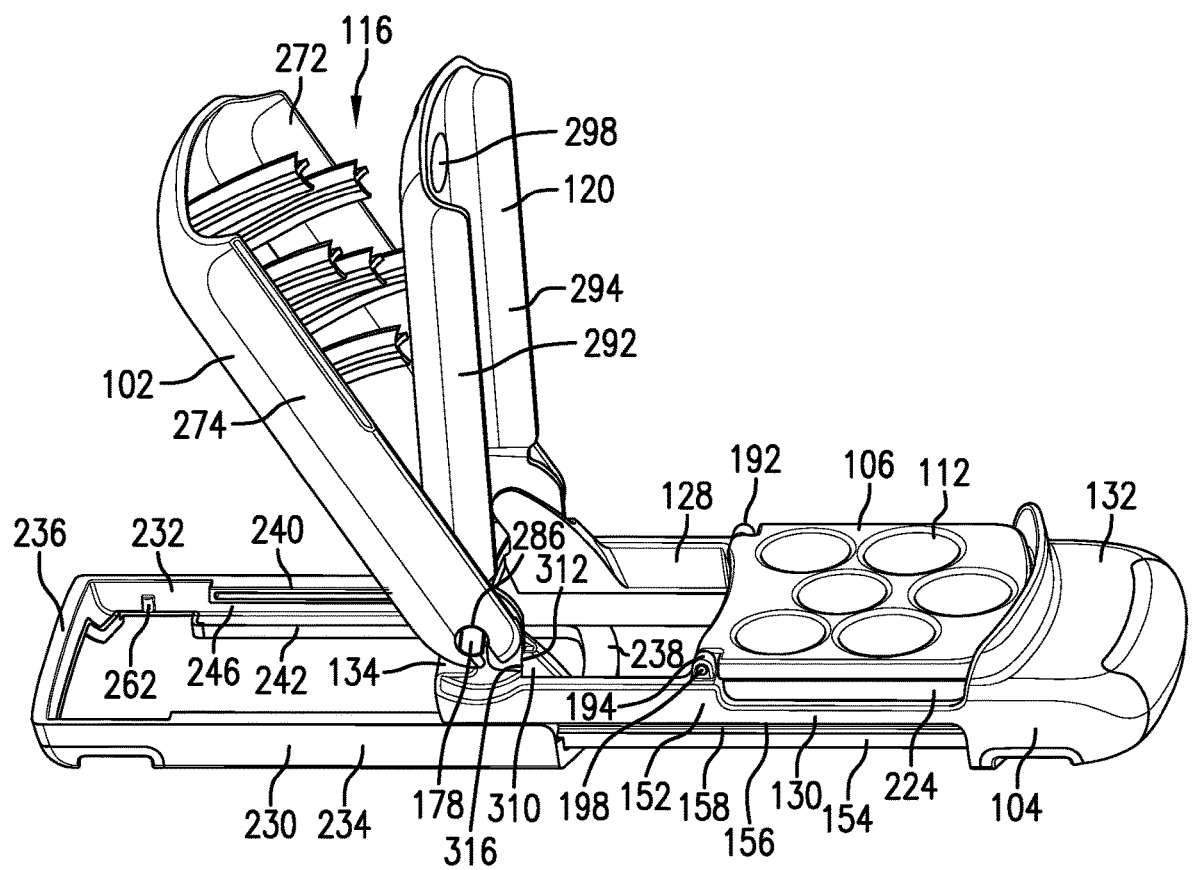
FIGS. 4-7 are perspective views of the fruit cutter of FIG. 1 depicting movement of a lid and a pusher plate.
Figure 5:
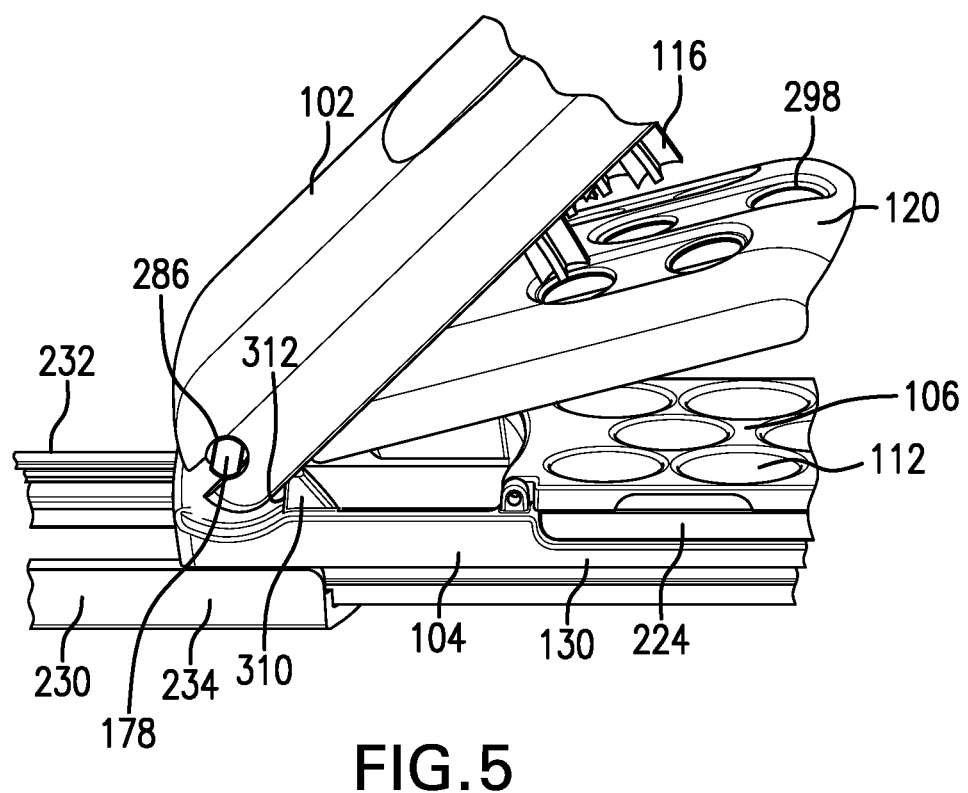
Figure 6:
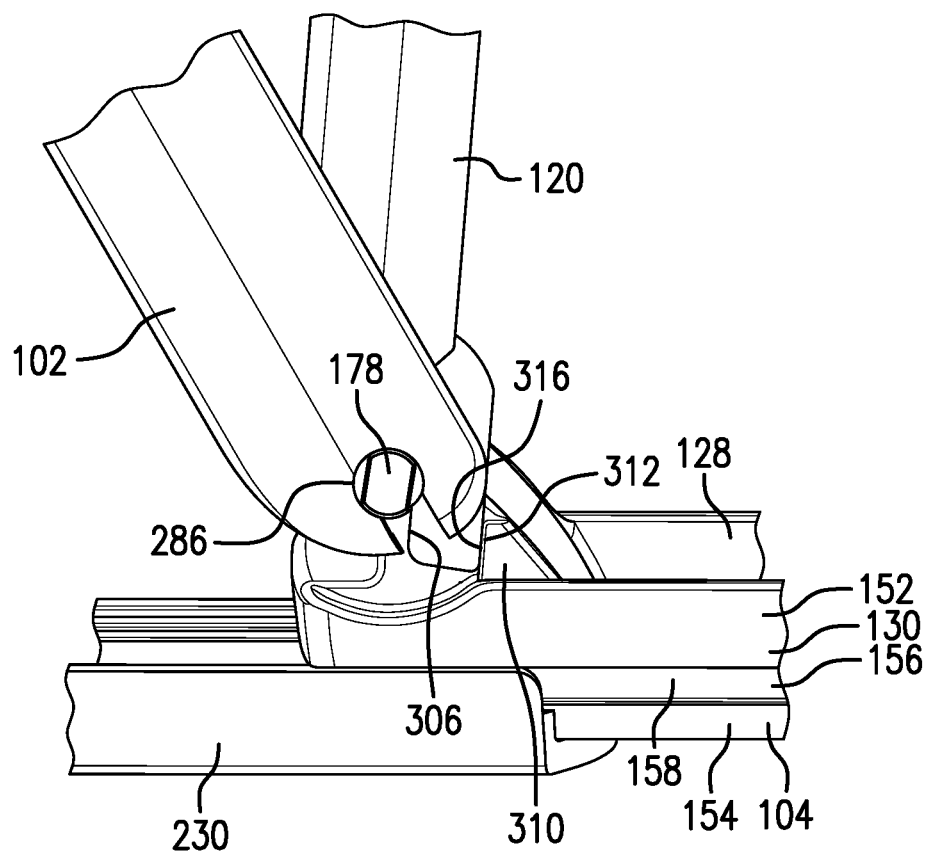
Figure 7:
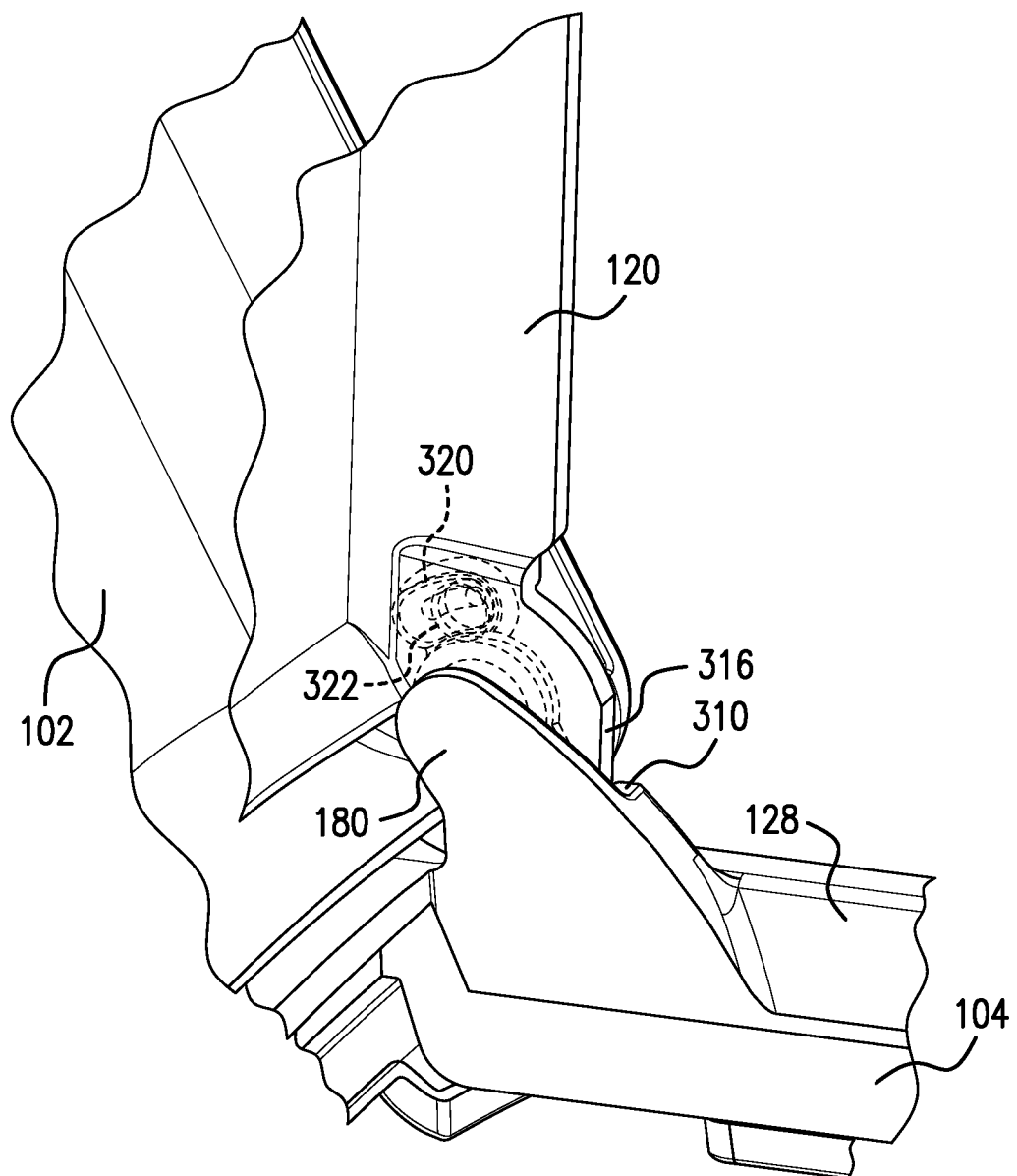

The frame 104 includes side portions 128, 130 and end portions 132, 134, which together form an interior cavity 138. According to the depicted aspect, the side portion 128 has a generally "c" shape and includes a first sidewall 140, a second sidewall 142 offset inwardly from the first sidewall 140 and a base wall 144 interconnecting the first and second sidewalls. The first and second sidewalls 140, 142 and the base wall 144 of side portion 128 together define an elongated channel or guide 150. The side portion 130 is similarly constructed, having a generally "c" shape, including first and second sidewalls 152, 154, a base wall 156, and defining an elongated channel or guide 158 (see FIGS. 4 and 6). The end portion 132, which can be configured as a handle having for gripping by the user, has a top wall 160, a bottom wall 162 and end wall 164 interconnecting the top and bottom walls. A flange 168 can extend upwardly from the top wall 160. As shown in FIG. 1, in a fully closed position of the lid 102 on the frame 104, the flange 168 is in contact with the lid 102. Lugs 176, 178 provided adjacent the end portion 134 of the frame 104 serve as pivoting axles for the lid 102 and the pusher plate 120, and therefore define the common rotational axis RA. In the depicted aspect, the lugs 176, 178 project outwardly from respective arms 180, 182 which extend upwardly from inner surfaces of the respective side portions 128, 130. The frame 104 further includes a cross member 190 extending between the side portions 128, 130. Retainers or bosses 192, 194 provided on the cross member 190 are adapted to receive pivot pins located on the holder 106 (only pivot pin 198 received in boss 194 is depicted in FIG. 4). Therefore, the holder 106 is pivotally mounted to the cross member 190 and is movable from a closed position covering the receptacle 122 (see FIG. 4) to an open position to provide access to the receptacle 122. The receptacle 122 includes a bottom wall 210, sidewalls 212, 214 and end wall 216, 218. The sidewalls 212, 214 include respective mounting flanges 222, 224 which are removably received over the side portions 128, 130 of the frame 104.

In the embodiment depicted in FIGS. 1-4, a leg 230 is slidably connected to the frame 104. The leg 230 is slidable between a retracted position where the leg is received within the frame and an extended position where the leg defines an extension of the frame. The leg in the extended position allows the cherry pitter 100 to be seated atop, for example, a large bowl for collection of the pitted cherries. The leg 230 includes sidewalls 232, 234 and end walls 236, 238. The sidewalls 232, 234 are configured to mate with the side portions 128, 130 of the frame 104. In the illustrated aspect, the sidewall 232 has a generally "c" shape and includes an inwardly extending upper wall 240 and an inwardly extending lower wall 242 which together define an elongated channel or guide 246. The sidewall 234 is similarly constructed, having a generally "c" shape and including an inwardly extending upper wall 250 and an inwardly extending lower wall 252 which together define an elongated channel or guide 256. The guide 150 of the frame side portion 128 slidingly receives the upper wall 240 of the sidewall 232, and the guide 246 of the sidewall 232 slidingly receives the second sidewall 142 of the side portion 128. Similarly, the guide 158 of the frame side portion 130 slidingly receives the upper wall 250 of the sidewall 234, and the guide 256 of the sidewall 234 slidingly receives the second sidewall 154 of the side portion 130. Further depicted, protrusions 260 can be provided on the frame 104 (for example on each second sidewall 142, 154) and corresponding protrusions 262 can be provided on the leg 230 (for example on each sidewall 232, 234) to secure the leg within the frame in the retracted position and limit the extension of the leg from the frame 104.

The lid 102 is configured to have an upper surface 270 with downwardly extending sidewalls 272, 274, the sidewalls being arranged to abut the side portions 128, 130 of the frame 104. Each of the cutting rods 116 depends from a base 280, and each base is fastened to an interior side of the upper surface 270 of the lid 102. The cutting rods 116 are shaped with a slight arc in the longitudinal direction and have a generally "+" shape. In use, the cutting rods 116 pass through the cherries held on the holder 106 and push the pits through the holes within the holder, retaining the pits within the receptacle 122. The pitted cherries stay on the cutting rods 116 until removed via engagement with the pusher plate 120. Further depicted in FIGS. 1-3, each sidewall 272, 274 of the lid 102 has a generally key-shaped opening 284, 286 for receiving the respective lugs 176, 178 which extend from the respective side portions 128, 130 of the frame 104. According to one aspect, as the lid 102 pivots about the lugs 176, 178, back edges of the arms 180, 182 engage an inner surface of the lid at the fully open position. Therefore, the arms 180, 182 serve as a rotational stop for the lid 102 in the fully open position.

The pusher plate 120 is located between the fruit holder 106 and the lid 102 and serves to facilitate separation of the cutting rods 116 from the cherries once the pits are pushed through. The pusher plate 120 includes an upper surface 290 with downwardly extending sidewalls 292, 294, and is sized to be received within the lid 102. The upper surface 290 includes a number of apertures 298 that are configured to allow the cutting rods 116 to pass through the pusher plate as the lid 102 is moved between the fully closed position and the fully open position. As indicated previously, the pusher plate 120 is pivotally attached to the frame 104, and the lid 102 and the pusher plate 120 rotate relative to the frame 104 about the common rotational axis RA. Similar to the lid 102, each sidewall 292, 294 of the pusher plate 120 has a generally key-shaped opening 304, 306 for receiving the respective lugs 176, 178. As depicted, the lugs 176, 178 are generally rectangular shaped in side view, and this shape allows each of the lid 102 and the pusher plate 120 to be pulled off vertically from the frame 104 when the respective key-shaped openings of the lid and pusher plate are aligned with the lugs 176, 178.

The pusher plate 120 is moveable in tandem with the lid 102 between a first position adjacent to and covering the fruit holder 106 and a second position away from the fruit holder 106. As shown in FIG. 4, the second position of the pusher plate 120 is angularly offset by, for example, an acute angle from the fully open position of the lid 102, and in the second position of the pusher plate 120, the pusher plate is oriented approximately perpendicular to the frame 104. In the depicted aspect, the frame 104 includes at least one stop member 310 configured to preclude movement of the pusher plate 120 past the second position. According to one embodiment, the at least one stop member 310 is provided on one of the first and second side portions 128, 130 of the frame 104. More particularly, the stop member 310 is provided on each of the first and second side portions 128, 130, the stop members 310 being spaced from the arms 180, 182 toward the end portion 132. Each of the stop members 310, which can be generally triangular shaped in side view, includes an engaging surface 312 configured to directly engage a corresponding engaging surface 316 provided on each sidewall 292, 294 of the pusher plate 120 when the pusher plate is oriented approximately perpendicular to the frame 104. Further, with the lid in the fully open position being angularly offset from the pusher plate 120 in the second position, the cutting rods 116 can be completely removed from the apertures 298 formed in the pusher plate 120 thereby ensuring that the pitted cherries are pushed off the cutting rods 116, allowing the pitted cherries to fall through that portion of the interior cavity 138 defined the frame 104 not covered by the fruit holder 106 (i.e., the portion of the interior cavity 138 defined by the side portions 128, 130, end portions 134, and cross member 190) and into, for example, a bowl beneath the cherry pitter 100.

FIGS. 4-7 depict the movement of the lid 102 between the fully open position and the fully closed position, and the movement of the pusher plate 120 between the second position and the first position. As shown, during movement of the lid 102 and the pusher plate 120, the two components 102, 120 can be angularly offset from one another relative to the common rotational axis. Therefore, after the cherries are pitted the lid 102 can move away from the pusher plate 120 allowing the cherries now secured on the cutting rods 116 to move off the fruit holder 106 and into engagement with the pusher plate 120 as the pusher plate 120 is caused to move to its second position. To allow for this feature, one of the lid 102 and the pusher plate 120 includes a slotted opening 320, and the other of the lid 102 and the pusher plate 120 includes a pin 322 slidably received in the slotted opening.

The slotted opening 320 defines an angular travel distance relative to the common rotational axis RA that the lid 102 and the pusher plate 120 move relative to one another. In the depicted aspect, the slotted opening 320 is provided on an inner surface of one of the sidewalls 272, 274 of the lid 102 and the pin 322 is provided on an outer surface of one of the sidewalls 292, 294 of the pusher plate 120.

Figure 8:
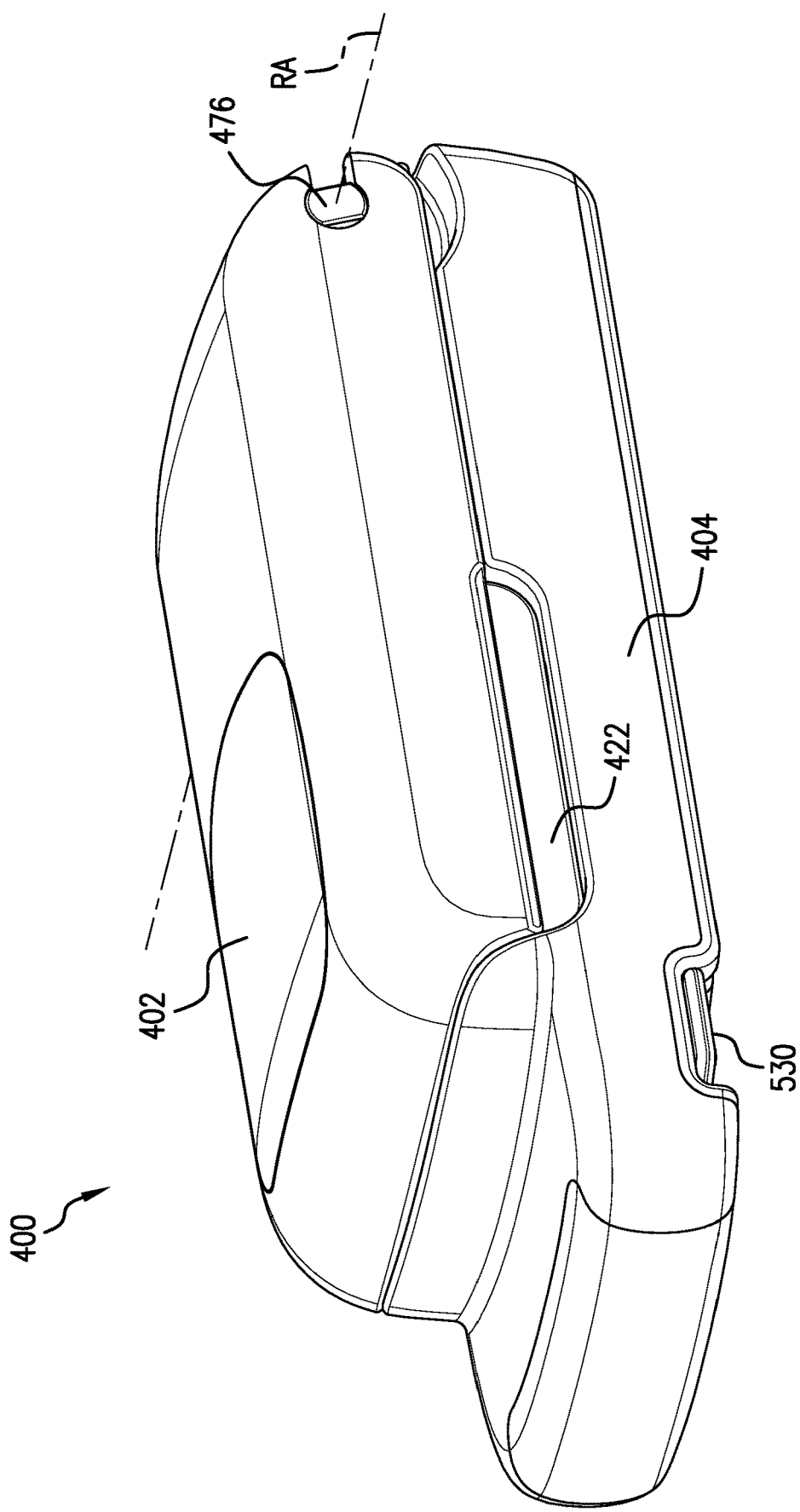
FIG. 8 is a perspective view of a fruit cutter according to another embodiment of the present disclosure.
Figure 9:
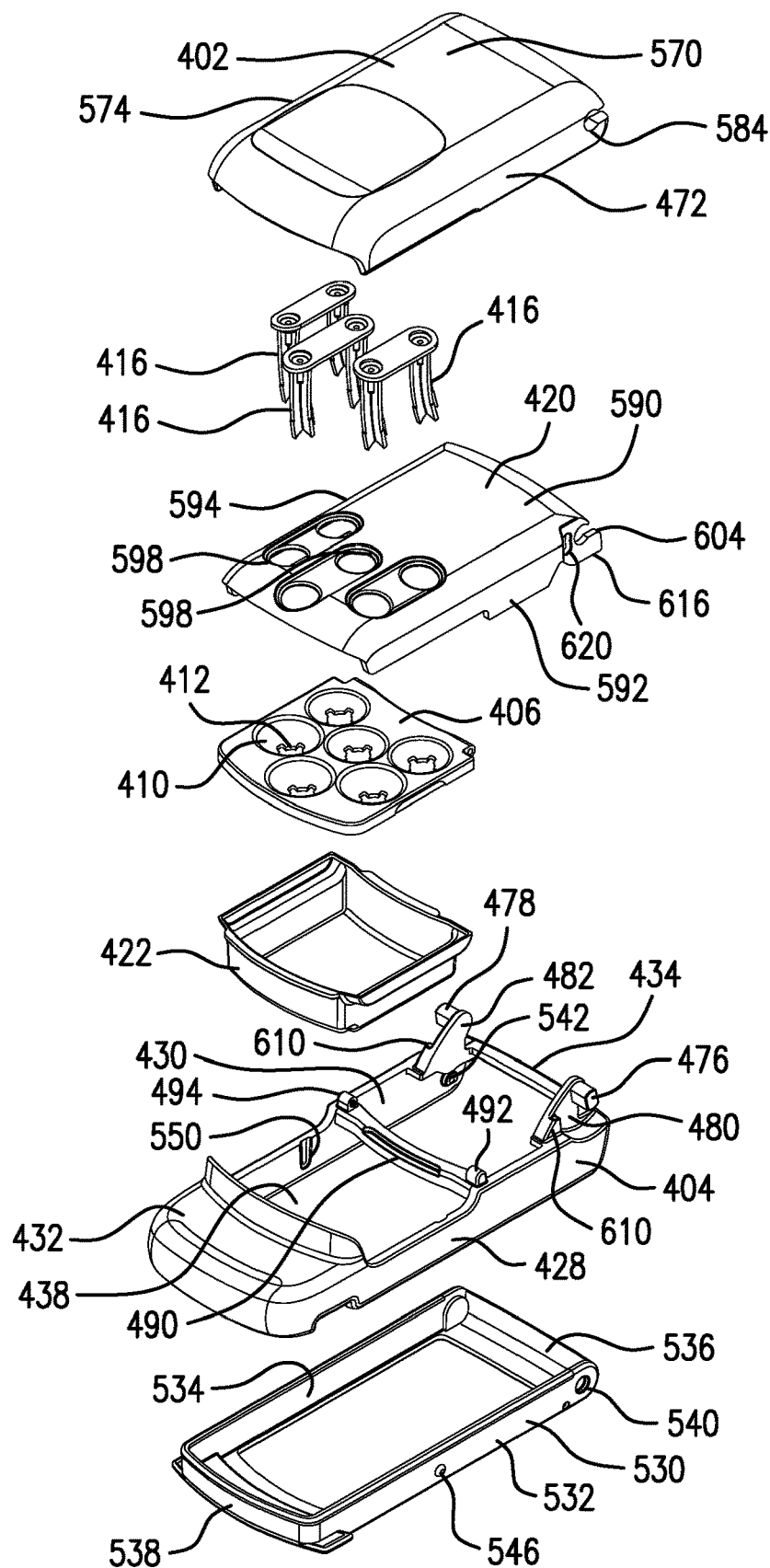
FIG. 9 is an exploded perspective view of the fruit cutter of FIG. 8.
Figure 10:
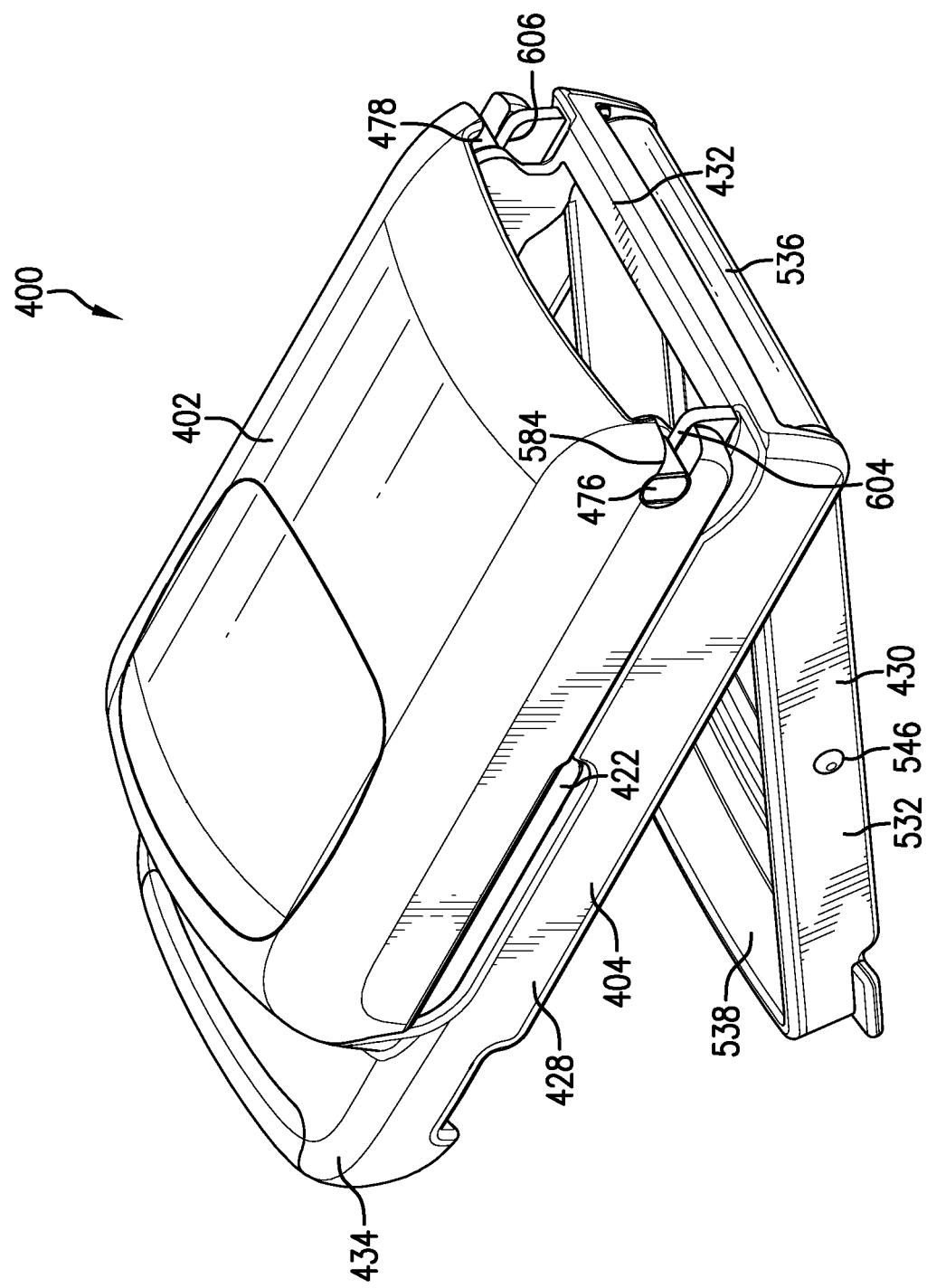
FIG. 10 is a perspective view of the fruit cutter of FIG. 8 with a leg pivoting toward an extended position.

FIGS. 8-10 depict another embodiment of a cherry pitter 400 according to the present disclosure. Similar to the cherry pitter 100, the cherry pitter 400 generally includes a lid 402 mounted on a supporting frame 404 for pivotal movement about a rotational axis RA. A fruit holder 406 is pivotally secured at the top of the frame. The fruit holder has at least one cavity 410 having a hole 412 formed therethrough for holding fruit on the holder 406 as the fruit is being pitted. At least one cutter or cutting rod 416 is secured to and depends from the lid 402. A pusher plate 420 is mounted to the frame 404 for pivotal movement about the same rotational axis RA, and a receptacle 422 is removably supported by the frame 404 beneath the fruit holder 406.

The frame 404 includes side portions 428, 430 and end portions 432, 434, which together form an interior cavity 438. The end portion 432 can be configured as a handle having for gripping by the user. A pair of lugs 476, 478 provided adjacent the end portion 434 of the frame 404 serve as pivoting axles for the lid 402 and the pusher plate 420, and therefore define the common rotational axis RA. In the depicted aspect, the lugs 476, 478 project outwardly from respective arms 480, 482 which extend upwardly from inner surfaces of the respective side portions 428, 430. Retainers or bosses 492, 494 provided on a cross member 490 are adapted to receive pivot pins located on the fruit holder 406. Therefore, the fruit holder 406 is pivotally mounted to the cross member 490 and is movable from a closed position covering the receptacle 422 to an open position to provide access to the receptacle 422. The receptacle 422 is removably received over the side portions 428, 430 of the frame 404.

Similar to the previous embodiment, a leg 530 is moveably connected to the frame 404. The leg 530 is moveable between a retracted position and an extended position. In the retracted position, the leg is received within the frame 404, and in the extended position the leg defines an extension of the frame. The leg 530 includes sidewalls 532, 534 and end walls 536, 538. In the depicted aspect, an end portion of each sidewall 532, 534 adjacent the end wall 536 includes a cavity 540 for receiving a pivot pin 542 extending inwardly from each side portion 428, 430 of the frame 404. Accordingly, the leg 530 is hingedly connected to the frame 404 and pivots about a rotational axis defined by the pivot pins 542. On an outer surface of each sidewall 532, 534 of the leg 530 is provided a protrusion 546. In the retracted position of the leg 530, each protrusion 546 is received in a slotted opening 550 formed on an inner surface of each side portion 428, 430 of the frame 404, which secures the leg within the frame.

The lid 402 is configured to have an upper surface 570 with downwardly extending sidewalls 572, 574. Each sidewall 572, 574 has a generally key-shaped opening 584, 586 for receiving the respective lugs 476, 478 which extend from the respective side portions 428, 430 of the frame. The pusher plate 420 includes an upper surface 590 with downwardly extending sidewalls 592, 594, and is sized to be received within the lid 502. The upper surface 590 includes a number of apertures 598 that are configured to allow the cutting rods 416 to pass through the pusher plate as the lid 402 is moved between the fully closed position and the fully open position. As indicated previously, the pusher plate 420 is pivotally attached to the frame 404, and the lid 402 and the pusher plate 420 rotate relative to the frame about the common rotational axis RA. Similar to the lid 402, each sidewall 592, 594 of the pusher plate 420 has a generally key-shaped opening 604, 606 for receiving the respective lugs 476, 478.

Similar to the previous embodiment, the arms 480, 482 can serve as a rotational stop for the lid 402 in the fully open position. The frame 404 additionally includes at least one stop member 610 configured to preclude movement of the pusher plate 420 past a predetermined position relative to the frame 404 (for example, a position approximately perpendicular to the frame 404). According to one aspect, the stop member 610 is provided on each of the first and second side portions 428, 430. Each of the stop members 610, which can be generally triangular shaped in side view, includes an engaging surface configured to directly engage a corresponding engaging surface 616 provided on each sidewall 592, 594 of the pusher plate 420. Further, during movement of the lid 402 and the pusher plate 420, the two components 402, 420 can be angularly offset from one another relative to the common rotational axis. To allow for this feature, one of the lid 402 and the pusher plate 420 includes a slotted opening, and the other of the lid and the pusher plate includes a pin slidably received in the slotted opening. The slotted opening defines an angular travel distance relative to the common rotational axis that the lid 402 and the pusher plate 420 move relative to one another. In the depicted aspect, the slotted opening 620 is provided on an outer surface of one of the sidewalls 592, 594 of the pusher plate 420 and an inner surface of one of the sidewalls 572, 574 of the lid 402 include the pin (not visible).

It will be appreciated that variations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A fruit pitter comprising:
   a supporting frame;
   a fruit holder supported by the frame, the fruit holder has a hole formed therethrough;
   a lid pivotally attached to the frame, the lid moveable between a fully closed position adjacent to the fruit holder and a fully open position away from the fruit holder;
   a cutting rod depending from the lid, the cutting rod passing through the fruit holder hole when the lid is moved from the fully open position to the fully closed position; and
   a pusher plate pivotally attached to the frame, the lid and the pusher plate adapted to rotate relative to the frame about a common rotational axis, the pusher plate located between the fruit holder and the lid, and the cutting rod adapted to pass through the pusher plate as the lid is moved between the fully closed position and the fully open position.

2. The fruit pitter of claim 1, wherein the pusher plate is moveable between a first position adjacent to and covering the fruit holder and a second position away from the fruit holder, the second position of the pusher plate is angularly offset from the fully open position of the lid.

3. The fruit pitter of claim 2, wherein in the second position of the pusher plate, the pusher plate is oriented approximately perpendicular to the frame.

4. The fruit pitter of claim 2, wherein the frame includes a stop member configured to preclude movement of the pusher plate past the second position.

5. The fruit pitter of claim 4, wherein the frame includes a first sidewall and a second sidewall facing the first side wall, one of the first and second sidewalls includes the stop member.

6. The fruit pitter of claim 4, wherein the stop member includes an engaging surface configured to directly engage the pusher plate when the pusher plate is oriented approximately perpendicular to the frame.

7. The fruit pitter of claim 2, wherein one of the lid and the pusher plate includes a slotted opening, and the other of the lid and the pusher plate includes a pin slidably received in the slotted opening, the slotted opening defines an angular travel distance relative to the common rotational axis that the lid and the pusher plate move relative to one another.

8. The fruit pitter of claim 2, wherein, a first lug extends from a first sidewall of the frame and a second lug extends from a second sidewall of the frame, the first and second lugs define the common rotational axis, the lid and the pusher plate are pivotally connected to the first and second lugs.

9. The fruit pitter of claim 1, further including a leg connected to the frame, the leg moveable between a retracted position and an extended position, wherein in the extended position the leg defines an extension of the frame.

10. The fruit pitter of claim 9, wherein the leg is hingedly connected to the frame.

11. The fruit pitter of claim 10, wherein in the retracted position the leg is received within the frame.

12. The fruit pitter of claim 9, wherein the leg is slidingly connected to the frame.

13. The fruit pitter of claim 12, wherein one of the frame and the leg includes an elongated channel and the other of the frame and the leg include a guide received in the elongated channel.

14. A fruit pitter comprising:
a supporting frame;
a fruit holder supported by the frame, the fruit holder has a hole formed therethrough;
a lid pivotally attached to the frame, the lid moveable between a fully closed position adjacent to the fruit holder and a fully open position away from the fruit holder;
a cutting rod depending from the lid, the cutting rod passing through the fruit holder hole when the lid is moved from the fully open position to the fully closed position; and
a pusher plate pivotally attached to the frame and moveable in tandem with the lid, the pusher plate located between the fruit holder and the lid, and the cutting rod adapted to pass through the pusher plate as the lid is moved between the fully closed position and the fully open position,
wherein the frame includes a stop member configured to preclude movement of the pusher plate past a predetermined orientation relative to the frame as the lid is moved to the fully open position where the lid is angularly offset from the pusher plate.

15. The fruit pitter of claim 14, wherein the lid and the pusher plate are adapted to rotate relative to the frame about a common rotational axis.

16. The fruit pitter of claim 14, wherein one of the lid and the pusher plate includes a slotted opening, and the other of the lid and the pusher plate includes a pin slidably received in the slotted opening, the slotted opening defines an angular travel distance relative to the common rotational axis that the lid and the pusher plate move relative to one another.

17. The fruit pitter of claim 14, further including a leg connected to the frame, the leg moveable between a retracted position and an extended position, wherein in the extended position the leg defines an extension of the frame.

18. The fruit pitter of claim 17, wherein the leg is one of hingedly and slidingly connected to the frame.

19. A fruit pitter comprising:
a supporting frame defining an interior cavity;
a fruit holder supported by the frame and at least partially covering the interior cavity, the fruit holder has a hole formed therethrough;
a lid pivotally attached to the frame, the lid moveable between a fully closed position adjacent to the fruit holder and a fully open position away from the fruit holder;
a cutting rod depending from the lid for penetrating fruit held by the fruit holder, the cutting rod adapted to pass through the fruit holder hole when the lid is moved from the fully open position to the fully closed position;
a pusher plate movable relative the lid, the cutting rod adapted to pass through an aperture formed in the pusher plate as the lid is moved between the fully closed position and the fully open position, wherein with the lid at least substantially in the fully open position movement of the pusher plate relative to the lid pushes pitted fruit off the cutting rod allowing the pitted fruit to fall through a portion of the interior cavity defined by the frame not covered by the fruit holder; and
a leg connected to the frame, the leg moveable between a retracted position and an extended position, wherein in the extended position the leg defines an extension of the frame.

* * * * *